April 27, 1926.  
W. R. HUME  
1,582,607  
MANUFACTURE OF CONCRETE SLABS AND THE LIKE  
Filed August 2, 1924
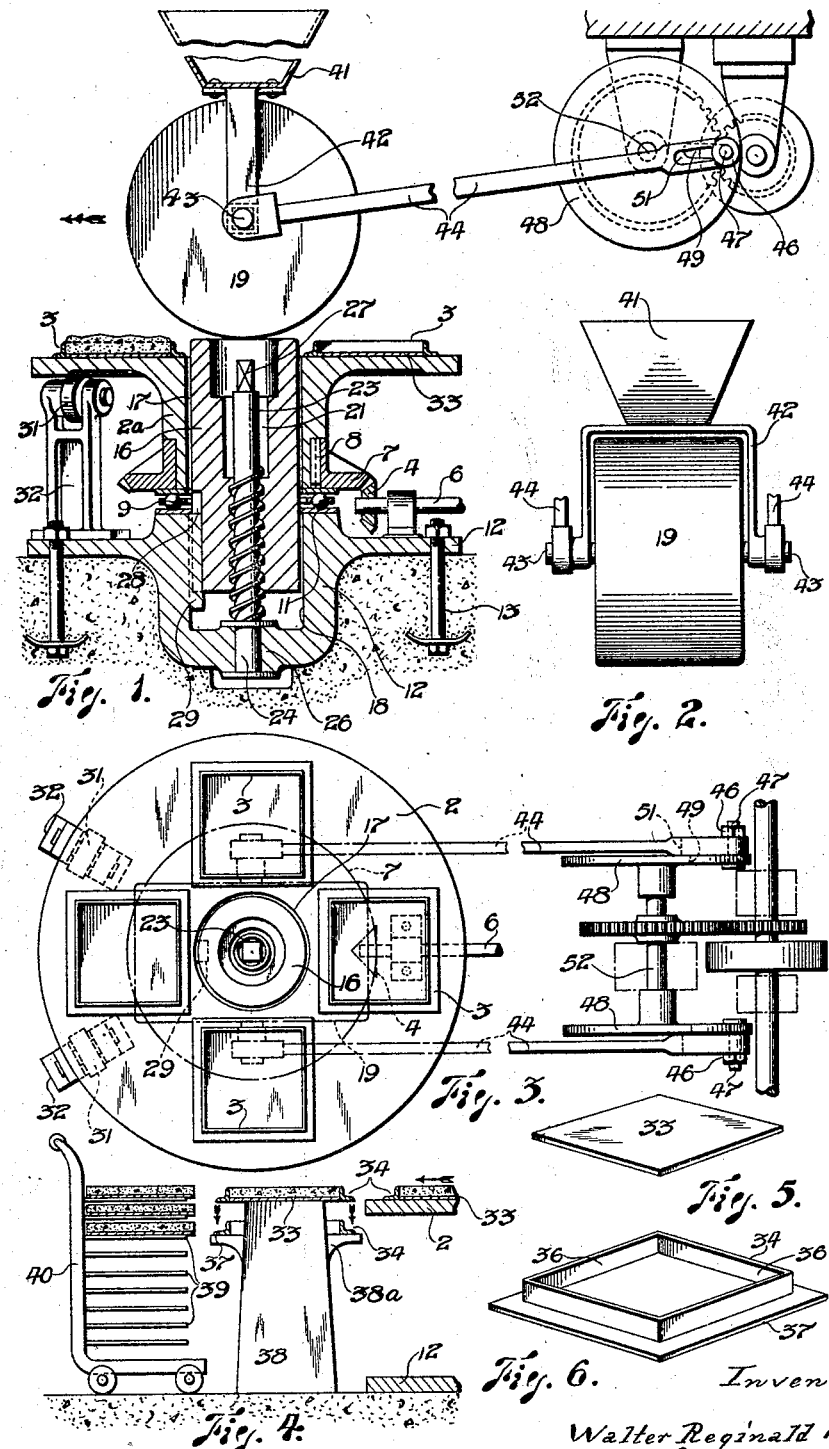
Inventor:  
Walter Reginald Hume Patented Apr. 27, 1926.

1,582,607

UNITED STATES PATENT OFFICE.

WALTER REGINALD HUME, OF MELBOURNE, VICTORIA, AUSTRALIA.

MANUFACTURE OF CONCRETE SLABS AND THE LIKE.

Application filed August 2, 1924. Serial No. 729,838.

*To all whom it may concern:*

Be it known that I, WALTER REGINALD HUME, a subject of the King of Great Britain and Ireland, and a resident of 301 Flinders Lane, Melbourne, in the county of Bourke, State of Victoria, Commonwealth of Australia (whose post-office address is 301 Flinders Lane, Melbourne, in the said county of Bourke, State of Victoria, Commonwealth of Australia), have invented certain new and useful Improvements Relating to the Manufacture of Concrete Slabs and the like, of which the following is a specification.

This invention relates to the moulding of concrete slabs, tiles, blocks and like articles by mechanical pressure.

Hitherto in the manufacture of such articles considerable difficulty has been experienced in eliminating air from the cementitious material whilst ensuring that the material is uniformly and densely compressed. It is well known that sand and aggregate mixed in a semi-dry state will not flow when placed under high pressure and consequently attempts to make slabs and the like by direct compression have failed owing to the presence of irregularities or relatively hard and soft portions in the compressed article.

The object of the present invention is to overcome the above objections and to provide an improved apparatus for moulding by roller compression articles of the kind indicated, the mechanism employed being relatively simple and inexpensive in construction and efficient and economical in operation.

Briefly the apparatus comprises a mould carrying table and a compressing roller situated above said table and adapted to be mechanically moved over the same to compress the cementitious article within the mould. The pressure of said roller on the article may be adjusted by ballasting or other suitable means and any suitable mechanism may be employed to reciprocate the roller backwards and forwards over the mould and thus uniformly and densely consolidate the material therein. The mould carrying table which affords support for a plurality of moulds at one time is mounted to rotate about a central vertical axis and means are provided to intermittently turn or partially rotate the table about said axis so that the moulds are brought successively to an operative position relative to the compressing roller or to what may be termed the compressing station. Whilst one mould is at this compressing station another mould may be disposed at a succeeding station where the moulded article is removed, and a further mould assembled or placed in position on the table whilst a still further mould is located at a filling station where the cementitious material is introduced into the mould.

But in order that this invention may be better understood reference will now be made to the accompanying sheet of drawings which are to be taken as part of this specification and read herewith:—

Figure 1 is a part sectional side view of an apparatus according to the invention. The plane of the section is diametrical of the mould carrying table the compression roller and driving means therefor being shown in elevation.

Figure 2 is a front view of the compressing roller and its ballast hopper.

Figure 3 is a plan of Figure 1, the compressing roller and portions of its driving connections being shown in broken lines.

Figure 4 is a view in side elevation showing a part of the revolving table with a mould thereon, a mould transfer or unloading table which may be employed to facilitate removal of the moulds from the rotary table and detachment of the moulds from the compressed slabs or like articles, and a trolley which is adapted to receive and transport a number of the compressed slabs or the like.

Figures 5 and 6 are perspective views respectively of a mould palette and a mould frame which are separate and removable from each other and are adapted to rest upon the rotary table beneath the roller during the compressing operation.

As seen in the drawings the mould carrying table 2 is arranged to rotate in a horizontal plane about a central vertical axis the moulds 3 on the table being thus brought successively to the various positions or stations, for filling, compressing and so on. Rotation of the table 2 may be accomplished by any suitable means such for instance as a bevel pinion 4 on a driving shaft 6 meshing with a bevel wheel 7 which may be fixed by a key 8 to a depending vertical portion or sleeve 2ª of the table 2 as shown.

Anti-friction devices, which may include balls 9 and wearing plates or rings as shown are preferably interposed between the rotary table or its depending sleeve 2ª and the adjacent face 11 of a stationary bed or base member 12. This member which provides a rigid foundation for the apparatus may be partially embedded in the ground and secured by suitable holding down bolts 13 or otherwise as desired.

The aforesaid vertical axis about which the table turns is furnished by a vertical column or post 16 of cylindrical cross section which forms a support for the compression roller as hereinafter mentioned. The said vertical column or roller support 16 is slidably accommodated by a central passageway 17 in the depending portion 2ª of the table and a coinciding passage 18 in the foundation member 12.

Suitable means are provided whereby the position of the roller support 16 may be adjusted so that its upper end projects the desired distance above the surrounding surface of the table 2 to support the compression roller 19 when the latter is out of action as seen in Figure 1. To effect this vertical adjustment of the roller support it may be provided with a central longitudinal passage 21 which is internally screw threaded for a portion of its length to accommodate a screw threaded portion of a turn table spindle or rod 23, the plain lower end 24 of which may pass through a bearing 26 formed in the base or foundation member 12. The spindle 23 may have a squared or flat sided upper end 27 and the surrounding portion of the passage 21 through the column 16 may be enlarged to readily admit a suitable tool which will engage and turn said square end 27 and thus rotate the screwed spindle 23. It will be evident that the supporting column may be thus raised or lowered according to the direction in which the spindle 23 is turned. Rotation of the vertical column 16 may be prevented by a groove or slot 28 formed in the exterior thereof being engaged by a guide or tongue 29 projecting inwardly from the foundation member 12.

Supporting means such as an idle roller or rollers 31 carried by brackets or the like 32 are preferably disposed beneath the table 2 adjacent the compressing station to support the weight of the compression roller as the latter is reciprocated over the filled mould resting on the table.

The moulds, designated in general by the numeral 3, preferably comprise a palette 33 and a frame unit 34 these two members being separate and removable from each other and from the table 2 and adapted to provide the rectangular or other moulding space for the semi-dry cementitious material during compression thereof. The palette 33, which forms the mould bottom, corresponds substantially in shape and size to the interior of the frame unit 34 which is adapted to fit around the palette as shown in Figures 1 and 4. As illustrated in Figure 6 the frame unit 34 is preferably made of metal of right angled or L shape in cross section the vertical webs or flanges 36 thereof forming the upstanding mould sides whilst the horizontal web 37 extending outwardly therefrom is adapted to rest flat upon the upper surface of the table 2.

To facilitate removal of the compressed articles from the moulds a stationary mould unloading table or support 38 (Figure 4) may be provided, intermediately of its height, with an outstanding shelf 38ª as seen in Figure 4, this stationary table 38 being conveniently disposed adjacent the rotary table 2 at the compressing and mould removing station. The upper surface of the table or support 38 is approximately flush with that of the rotary table 2 so that the mould containing the compressed article may be readily moved from the latter to the former stationary table or support 38. The area of the top of the table or support 38 does not exceed that of the mould palette 33 so that the mould frame unit 34 may be withdrawn downwardly from the compressed article with the palette resting on the table 38 so that the edge of the moulded article will not be damaged. The frame unit may then be placed upon the outstanding shelf 38ª whilst the compressed slab or article is removed upon the mould palette to set or season. The palettes with the compressed articles thereon may be placed upon superposed shelves 39 of a wheeled trolley 40 and transported thereby to any desired position.

The compressing roller 19 may be constructed of any suitable material and may be provided with a ballast hopper 41 whereby it may be loaded to increase its pressure according to requirements, the density of the material in the finished article being obviously governed by the weight or pressure of the roller and the frequency with which it is passed over the filled mould. The said ballast hopper may be attached to a yoke or support 42 which is connected at its lower ends to the roller spindle or axle 43 as seen in Figure 2.

Any suitable means may be employed for reciprocating the compression roller over the moulds for instance a duplex crank or eccentric mechanism such as shown in the drawings may be advantageously used. According thereto the roller 19 is equipped with draw bars or connecting rods 44 connected at one end to the roller axle 43 at each side of the roller. The other ends of these draw bars may be attached by nuts 46 to crank pins or projections 47 carried by a pair of co-operating crank arms or discs 48. In order that the reciprocating movement or stroke of the roller may be varied adjusting slots 49 are provided in the cranks 48 to accommodate the crank pins 47 which may thus be adjusted radially to vary the throw of the cranks and the degree of movement of the compressing roller at each stroke. The adjacent ends of the draw bars 44 may also be provided with elongated slots or eyelets 51 to permit of such adjustments being made without requiring that the normal or inoperative position of the roller should be altered. The duplex cranks 48 are mounted on a driving shaft 52 which may be driven by toothed or other gearing from a suitable source of power. By employing a duplex crank mechanism and draw bars as above described the heavy compression roller is effectively operated and guided in its reciprocating movement over the moulds.

Any suitable means may be employed to control the operation of the roller driving mechanism and also the table driving gear so that the compressing roller and the rotary table 2 are operated intermittently and in proper timed relationship the roller being reciprocated over the filled mould whilst the table 2 is stationary and the table being turned whilst the roller is resting on its supporting column or member 16, as hereinafter described.

When out of action the compressing roller rests upon its support 16 as indicated in Figure 1 until one of the moulds 3 with the cementitious material therein has been brought into position at the compressing station where it is in alignment with the travel of the roller. The rotary movement of the table 2 is then arrested and the compressing roller is automatically reciprocated over the mould by its driving gear to thereby densely and uniformly compress the material within the mould. When the compression of the article has been completed the roller 19 is returned to its inoperative position resting upon the top of its support 16 whilst the table 2 is again turned or partially rotated so that the compressed article is moved to the next station for removal of the article and the mould containing same as previously described. The table 2 is then again turned to bring the next succeeding filled mould thereon to the compressing station in the path of the roller. The successive operations of filling the moulds, compressing the material therein, removing the moulds with the compressed articles, and assembling or positioning the fresh moulds upon the rotary table, may thus be performed without interruption so that the workmen attending to the respective operations are continuously occupied.

Fancy or other designs may be readily imparted to the articles during manufacture by forming the requisite design or pattern in relief on the face of the roller and/or on the removable palette or bottom member of the mould.

Having now described my invention what I claim as new and desire to secure by Letters Patent is:—

1. Apparatus for the manufacture of concrete slabs and the like by compression comprising in combination a rotary table adapted to support open topped moulds containing the material to be compressed and to be intermittently rotated or turned to successively position said moulds at a compressing station, a compression roller and means for reciprocating said roller over the moulds whilst they are successively positioned at said compressing station for the purpose specified.

2. Apparatus for moulding concrete slabs and the like by compression consisting in the combination of a rotary mould carrying table adapted to support open topped moulds containing the cementitious material to be compressed, means for intermittently rotating or turning said table about a vertical axis, a compression roller, mechanism for intermittently reciprocating said roller over the moulds on said table whilst the latter is stationary, and means for supporting said compression roller to remove its weight from said table during the turning movement of the latter for the purpose specified.

3. Apparatus for moulding concrete slabs and the like by compression consisting in the combination of a rotary mould carrying table adapted to support open topped moulds containing the cementitious material to be compressed, a vertical column passing through said table and forming an axis therefor, a compression roller adapted to rest upon said column to remove the weight of the roller from said table during the turning movement of the latter, and means for intermittently moving said roller over the moulds on said table whilst the latter is stationary for the purpose specified.

4. Apparatus for moulding concrete slabs and the like by compression consisting in the combination of a rotary mould carrying table adapted to support open topped moulds containing the cementitious material to be compressed, a vertical column slidably accommodated within a vertical passageway formed through said table above which the top of said column is adapted to project, a compression roller adapted to rest upon said column whereby the weight of said roller is removed from said table during the turning movement of the latter, means for intermittently moving said roller over the moulds on said table whilst the latter is stationary, and height adjusting means for raising and lowering said vertical column in relation to the surface of said table for the purpose specified.

5. Apparatus for moulding concrete slabs and the like by compression consisting in the combination of a rotary mould carrying table adapted to support open topped moulds containing the cementitious material to be compressed, a vertical column passing through said table and forming an axis therefor, a compression roller adapted to rest upon said column whereby the weight of said roller is removed from said table during the turning movement of the latter, means for intermittently reciprocating said roller over the moulds on said table whilst the latter is stationary, a vertical screw adapted to turn within a corresponding screw threaded passage in said vertical column, and means to prevent rotation of said roller supporting column whereby the rotary movement of said screw causes the column to be raised or lowered in relation to the rotary table substantially as described.

6. Apparatus for the manufacture of concrete slabs and like articles by compression comprising in combination a rotary table adapted to support open topped moulds containing the material to be compressed and to be intermittently rotated or turned about a vertical axis to bring said moulds successively into an operative position at a compressing station, a compression roller, means for reciprocating said roller over the moulds as they are successively positioned at said compressing station, and supporting means comprising idle rollers mounted beneath and engaging the rotary table adjacent said compressing station for the purpose specified.

7. In apparatus for moulding concrete slabs and the like by compression the combination of a compressing roller and means for reciprocating said roller over open topped moulds containing the cementitious material to be compressed, said roller reciprocating means consisting of a duplex crank mechanism coupled to each end of said roller by a pair of draw bars or connecting rods substantially as described.

8. In apparatus for moulding concrete slabs and the like by compression the combination of a compressing roller and means for reciprocating said roller over open topped moulds containing the cementitious material to be compressed, said roller reciprocating means consisting of a duplex crank mechanism coupled to each end of said roller by a pair of draw bars or connecting rods, and means for adjusting the throw of said duplex crank mechanism for the purpose specified.

9. A concrete moulding machine comprising a table adapted to receive the moulds; a roller adapted to be moved over a mould in order to place the concrete in the mould under high pressure when the roller is moved thereover; means for automatically reciprocating said roller over said mould; and means whereby said roller may exert a greater pressure.

10. Apparatus for the manufacture of concrete slabs and the like by compression, comprising in combination a foundation member or base structure, a vertical axle member supported by said base structure, a rotary mould supporting table disposed around said axle member, removable open topped moulds comprising interchangeable palletes and frame units adapted to rest upon said rotary table, a compression roller disposed above said table, means for reciprocating said roller over the moulds as they are successively brought into the path of said roller, and whilst the table is stationary and means for supporting said roller whilst the table is being revolved, for the purpose specified.

In testimony whereof I affix my signature.

W. R. HUME.